United States Patent
Lee et al.

(10) Patent No.: US 7,986,940 B2
(45) Date of Patent: Jul. 26, 2011

(54) AUTOMATIC WIRELESS NETWORK LINKING METHOD WITH SECURITY CONFIGURATION AND DEVICE THEREOF

(75) Inventors: Ching-Hsiang Lee, Taipei (TW); Chih-Chiang Chou, Taipei (TW)

(73) Assignee: Azurewave Technologies, Inc., Taipei (TW)

( * ) Notice: Subject to any disclaimer, the term of this patent is extended or adjusted under 35 U.S.C. 154(b) by 994 days.

(21) Appl. No.: 11/773,571

(22) Filed: Jul. 5, 2007

(65) Prior Publication Data
US 2009/0010230 A1  Jan. 8, 2009

(51) Int. Cl.
*H04M 1/66* (2006.01)

(52) U.S. Cl. ....... 455/411; 455/41.2; 455/410; 370/310; 370/328; 370/338; 709/225; 709/226; 709/227; 709/228; 709/229; 713/150; 713/155; 713/168; 713/169; 713/171; 380/247; 380/270; 380/277; 380/278; 380/285

(58) Field of Classification Search .................. 455/410, 455/411, 41.2; 370/338, 310, 328; 709/225, 709/226, 227, 228, 229; 713/150, 155, 168, 713/169, 170, 171; 380/247, 259, 260, 270, 380/277, 278, 279, 285
See application file for complete search history.

(56) References Cited

U.S. PATENT DOCUMENTS

| | | | |
|---|---|---|---|
| 7,263,357 B2 * | 8/2007 | Lee et al. ................... 455/432.1 |
| 7,275,157 B2 * | 9/2007 | Cam Winget ................. 713/168 |
| 7,317,712 B2 * | 1/2008 | Ishimura ...................... 370/338 |
| 7,844,057 B2 * | 11/2010 | Meier et al. .................. 380/270 |
| 2004/0068653 A1 * | 4/2004 | Fascenda ...................... 713/168 |
| 2006/0039341 A1 * | 2/2006 | Ptasinski et al. ............. 370/338 |
| 2006/0253559 A1 * | 11/2006 | Espina Perez et al. ....... 709/222 |
| 2008/0220741 A1 * | 9/2008 | Hung ............................ 455/411 |

* cited by examiner

*Primary Examiner* — Olumide T Ajibade Akonai
(74) *Attorney, Agent, or Firm* — Rosenberg, Klein & Lee

(57) ABSTRACT

An automatic wireless network linking method with a security configuration includes: providing an access point with a floating service set identifier and a shared key. The floating service set identifier has a prefix name. Next, a host system is provided to execute a setting and linking application to automatically scan the access point with the prefix name and obtain the floating service set identifier of the access point. Both the access point and the setting and linking application perform an operation process to generate a dynamic key. The dynamic key is converted into a wireless network encryption algorithm. Finally, the host system links to the access point to perform wireless communication, and uses the wireless network encryption algorithm to encrypt and decrypt data. Thereby, the time required for setting up the wireless network platform is reduced.

9 Claims, 2 Drawing Sheets

AUTOMATIC WIRELESS NETWORK LINKING METHOD WITH SECURITY CONFIGURATION AND DEVICE THEREOF

BACKGROUND OF THE INVENTION

1. Field of the Invention

The present invention relates to an automatic wireless network linking method. In particular, this invention relates to an automatic wireless network linking method with a security configuration and a device thereof.

2. Description of the Related Art

Recently, information has become increasingly digitalized so that a large amount of information is available on the Internet. People use the Internet to search for required data. All kinds of information, including the living information and the scientific information, are available on the Internet. Furthermore, the Internet is a global phenomenon making distance national boundaries increasingly irrelevant. The Internet links the world into a single entity and is used as a communication bridge between nations.

The Internet has developed into a wireless network from a wired network. The Internet can be accessed over a given area connected via wireless radio waves. The space occupied by the wires for a wired network is therefore not required. Furthermore, it is more convenient and flexible for users to use wireless networks.

However, wireless networks need an access point (AP) to provide a wireless network protocol service, address management, and related security algorithms for the system located within its coverage area. In the related technology, each access point has a service set identifier (SSID) to identify a different network. The user sets different SSID in the system to enter a different network. In other words, an SSID is the name of the network. Systems having the same SSID can communicate with each other. There is however, a risk in transmitting data via a network. Therefore, when a user wishes to set the system to use an access point to access a wireless network, he or she needs to set a security configuration to secure the data as it is being transmitted.

In the setting process, the user firstly needs to search for the signal of the access point. The related information (such as a network protocol, an IP address) for the access point is configured in the system. Next, the security configuration is configured. Finally, the system is linked to the access point and the user can use the wireless network service.

Although the complex configuring process has been simplified, it is still difficult for many users. A normal user still spends a lot of time and effort to set the security configuration for the wireless network. Therefore, how to make the system automatically identify and link to the access point and finish the security configuration when the user sets up the wireless network is a desired goal.

SUMMARY OF THE INVENTION

One particular aspect of the present invention is to provide an automatic wireless network linking method with a security configuration. It utilizes the firmware in an access point to cooperate with the related software application in the host system to enable the software application in the host system to automatically link with a wireless network with a security configuration, without the need to change the hardware of the host system or the access point. Thereby, the time required for setting up the wireless network platform is reduced, efficiency is increased, and it is more convenient for the user.

The present invention provides an automatic wireless network linking method with a security configuration. The steps includes: providing an access point (AP) with a floating service set identifier (SSID) and a shared key. The floating service set identifier has a prefix name. Next, a host system is provided to execute a setting and linking application to automatically scan the access point with the prefix name and obtain the floating service set identifier of the access point. The setting and linking application also has a shared key that is the same as the shared key in the access point. Both the access point and the setting and linking application perform an operation to operate the floating service set identifier with the shared key to form a dynamic key. The dynamic key is transferred into a wireless network encryption algorithm. Finally, the host system links to the access point to perform wireless communication, and uses the wireless network encryption algorithm to encrypt and decrypt data. Thereby, the wireless network linking with the security configuration is completed.

The present invention also provides an automatic wireless network linking device with a security configuration. The automatic wireless network linking device with a security configuration includes an access point and a host system. The access point has a floating service set identifier (SSID) and a shared key. The floating service set identifier has a prefix name. The host system is used to execute a setting and linking application to automatically scan the access point according to the prefix name and obtain the floating service set identifier of the access point. The setting and linking application has a shared key that is the same as the shared key in the access point. Both the access point and the setting and linking application perform an operation to operate the floating service set identifier with the shared key and convert the result into a wireless network encryption algorithm. Finally, the host system links to the access point to perform wireless communication via the wireless network encryption algorithm. Thereby, the wireless network linking with the security configuration is completed.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
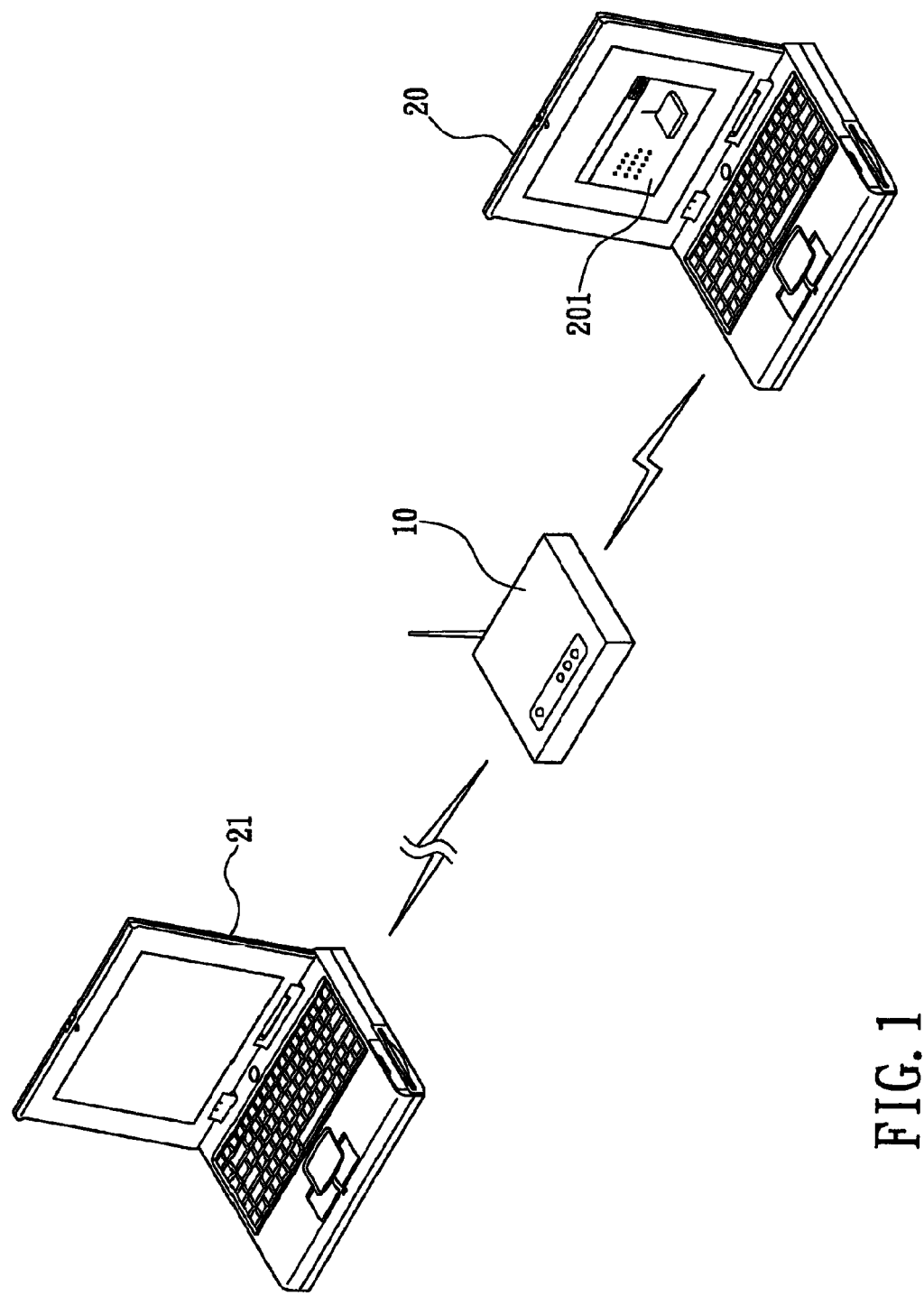
FIG. 1 is a schematic diagram of the embodiment of the present invention.

Reference is made to FIG. 1, which shows a schematic diagram of the embodiment of the present invention. The present invention is used for setting the automatic wireless network link between an access point 10 and a host system 20. The host system 20 executes a setting and linking application 201 to automatically scan the access point 10 within the area covered by the wireless radio wave and matches the configured parameters. Both the access point and the setting and linking application 201 share the same key to generate a security key for the wireless network linking. Therefore, after both the host system 20 and the access point 10 generate the security key, a wireless network link between the host system 20 and the access point 10 is established via the security key.

In FIG. 1, because another host system 21 is not installed with the setting and linking application 201 that corresponds to the access point 10, the other host system 21 does not share a key. Therefore, the host system 21 cannot generate the same security key to establish wireless communication with the access point 10. Thereby, the user can execute the setting and linking application 201 in the host system 20 to link to the access point 10. The access point 10 merely links to the host system 20 with the same security key, and prevents the other host system 21 from linking to the access point 10.

Figure 2:
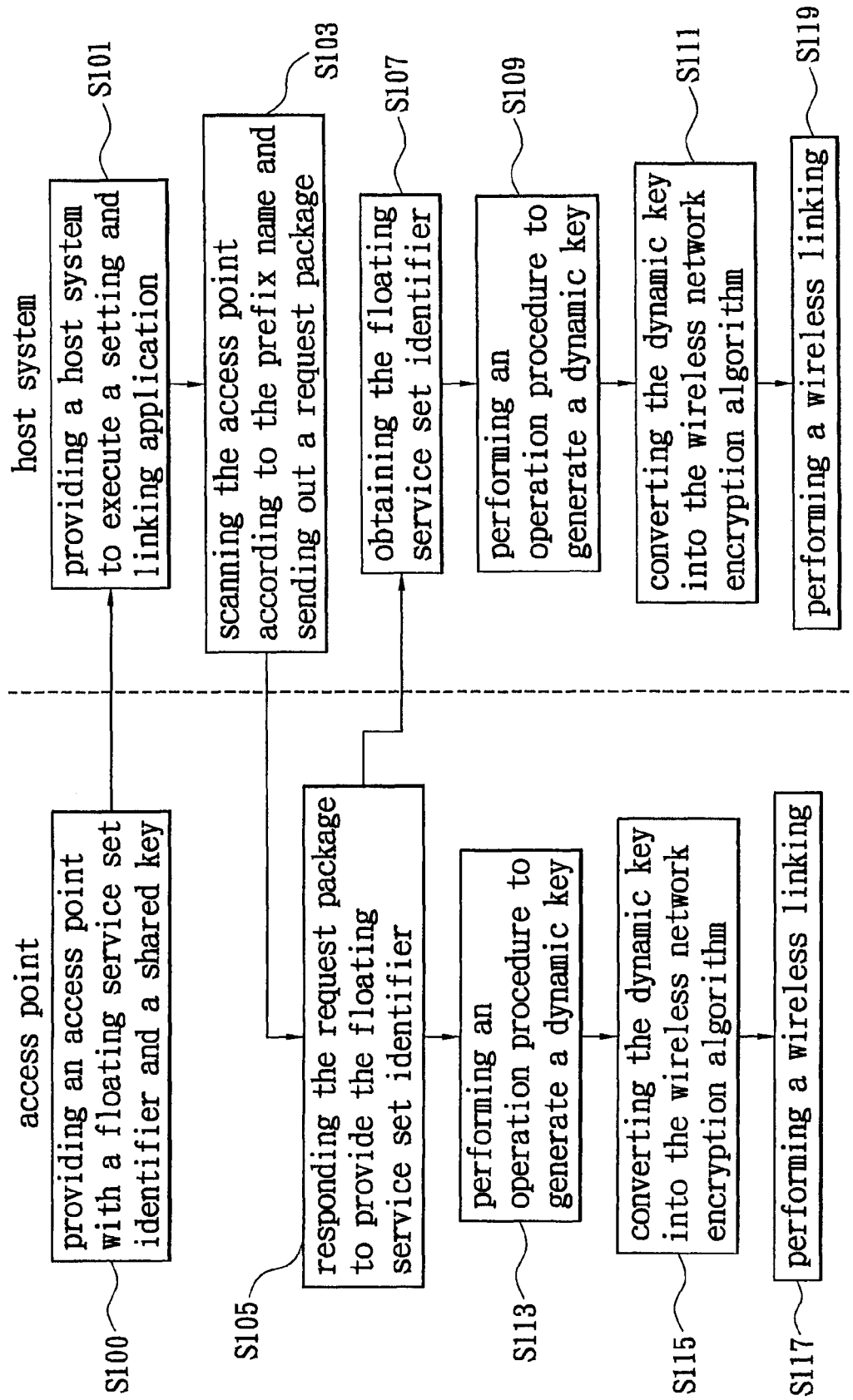
FIG. 2 is a flow chart of the automatic wireless network linking method with a security configuration of the embodiment of the present invention.

Reference is made to FIG. 2, which shows a flow chart of the automatic wireless network linking method with a security configuration of the embodiment of the present invention. The user can easily set up the wireless network platform with the security configuration. As shown in FIG. 2, the automatic wireless network linking method with a security configuration includes: providing an access point 10 with a floating service set identifier (SSID) and a shared key (S100). The floating service set identifier has a prefix name to represent the access point 10.

In order to generate a different floating service set identifier to increase security when the access point 10 starts up, the floating service set identifier includes a random number identifier and a device name. The random number identifier is generated by a random number generator when the access point 10 starts up, and is an active variable. The device name is inputted by the user so as to name the access point 10. The user can decide whether or not to name the access point 10 depending on his or her requirements. The device name is a passive variable. Therefore, the floating service set identifier of the access point 10 includes a prefix name, a random number identifier, and a device name, all of which are arranged orderly. Therefore, the floating service set identifiers are different due to the active variable and the passive variable.

Next, a host system 20 is provided to execute a setting and linking application 201 (S101). The setting and linking application 201 has a shared key that is the same as that of the access point 10. When the setting and linking application 201 is executed, the host system automatically scans the access point 10 according to the prefix name (the configured parameter) and sends out a request package (S103). After the access point 10 receives the request package, it responds to the request package by providing the floating service set identifier of the access point 10 to the host system 20 (S105). At this time, the host system 20 receives the floating service set identifier so that the setting and linking application 201 obtains the floating service set identifier (S107).

The setting and linking application 201 performs an operation process to operate the floating service set identifier with the shared key to generate a dynamic key (S109). At this time, the dynamic key does not meet the wireless network standard so the wireless network cannot perform an operation. Therefore, the setting and linking application 201 converts the dynamic key into a wireless network encryption algorithm (S111). Thereby, when data is transmitted via the wireless network, the data can be encrypted or decrypted. Similarly, after the access point 10 executes S105 in response to the request package of the host system 20, the access point 10 also performs an operation to operate the floating service set identifier with the shared key to generate a dynamic key (S1113). The access point 10 also converts the dynamic key into the wireless network encryption algorithm (S115). Thereby, when data is transmitted via the wireless network, the data can be encrypted or decrypted.

After both the access point 10 and the setting and linking application 201 of the host system 10 convert the dynamic key into the wireless network encryption algorithm, the access point 10 can establish wireless communication with the host system 20 under the encryption and the decryption of the wireless network encryption algorithm (S117, S119) because both the wireless network encryption algorithms are the same.

The operation performed on the access point 10 and the setting and linking application 201 can be implemented by a message digest-5 (MD-5), a digital encryption standard (DES), an advanced encryption standard (AED), or other mathematical calculating methods. The wireless network encryption algorithm can be a wired equivalent privacy (WEP), or a Wi-Fi protected access-pre-shared key (WPA-PSK or WPA2-PSK).

Furthermore, in order to increase security of the dynamic key, a physical address, a user name, and a password are added into the operation process, and are assembled with the floating service set identifier and operated by the shared key. The physical address is a physical address of the wireless network interface of the access point 10. The physical address, the user name, and the password can be inputted into the access point 10 via a wired network input device (such as a network keyboard). At the host system 20, the setting and linking application 201 displays a request to ask the user to input the required data.

In order to illustrate the floating service set identifier, the operation process, and the wireless network encryption algorithm generating and converting process in more detail, the following example is offered.

For example, the prefix name of the access point 10 is "AW-GV910", the generated random number identifier is "e0AJ", and the device name is "Eric". The floating service set identifier is "AW-GV910e0AJEric". In order to increase security, the physical address "0x0015AF123456" and the user name "admin" are inputted.

Next, the floating service set identifier, the physical address, and the user name are assembled and perform a MD-5 operation process via the shared key (such as a string with 32 bytes) to generate a dynamic key "0x0f05d135c7603243c7e62f89a483a159".

In order to meet the wireless network encryption algorithm, the dynamic key has to be converted. For example, when a WEP 64 bit algorithm is adopted, the converted result obtains the first five bytes of the dynamic key, "0f05d135c7". When a WEP 128 bit algorithm is adopted, the converted result obtains the first thirteen bytes of the dynamic key, "0f05d135c7603243c7e62f89a4". When a WPA-PSK algorithm is adopted, the converted result obtains all bytes of the dynamic key due to there is no fixed length for the passpharse, "0x0f05d135c7603243c7e62f89a483a159". Finally, the host system 20 and the access point 10 select the same wireless network encryption algorithm to encrypt or decrypt the data when the data is transmitted.

By utilizing the present invention, when the user sets up a wireless network platform, the user does not need to be taught or aware of the configuration process. The user merely executes the setting and linking application at the host system to finish the wireless linking between the host system and the access point, and the related security configuration is configured. The data transmitted over the wireless network is protected and secure. Thereby, the time required for setting up the wireless network platform is reduced, efficiency is increased, and it is more convenient for the user.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. An automatic wireless network linking method with a security configuration, comprising: providing an access point with a floating service set identifier and a shared key, wherein the floating service set identifier has a prefix name and a random number identifier, the random number identifier being generated by a random number generator when the access point starts up and is an active variable; providing a host system to execute a setting and linking application for automatically scanning the access point with the prefix name and obtaining the floating service set identifier and the shared key of the access point, so that the setting and linking application shares the same shared key with the access point; performing an operation process to operate the floating service set identifier with the shared key to form a dynamic key via both the access point and the setting and linking application, wherein the dynamic key is converted into a wireless network encryption algorithm; and forming a wireless link between the host system and the access point and using the wireless network encryption algorithm to encrypt and decrypt data.

2. The automatic wireless network linking method with a security configuration as claimed in claim 1, wherein the floating service set identifier further comprises a device name for inputting the name of the access point to form a passive variable; thereby, the floating service set identifier includes the prefix name, the random number identifier, and the device name, and the generated floating service set identifiers are different from each other due to the active variable and the passive variable.

3. The automatic wireless network linking method with a security configuration as claimed in claim 1, wherein a physical address, a user name, and a password are added into the operation process to be assembled with the floating service set identifier and operate with the shared key to form the dynamic key.

4. The automatic wireless network linking method with a security configuration as claimed in claim 3, wherein the physical address is a physical address of a wireless network interface of the access point.

5. The automatic wireless network linking method with a security configuration as claimed in claim 1, wherein the operation procedure is a message digest-5, a digital encryption standard, an advanced encryption standard, or any other kind of mathematical algorithm.

6. The automatic wireless network linking method with a security configuration as claimed in claim 1, wherein the wireless network encryption algorithm is a wired equivalent privacy (WEP), a Wi-Fi protected access—pre-shared key, or a Wi-Fi protected access2—pre-shared key.

7. An automatic wireless network linking device with a security configuration, comprising: an access point having a floating service set identifier and a shared key, wherein the floating service set identifier has a prefix name and a random number identifier, the random number identifier being generated by a random number generator when the access point starts up and is active variable; and a host system used for executing a setting and linking application to automatically scan the access point according to the prefix name and obtaining the floating service set identifier and the shared key of the access point; wherein the setting and linking application and the access point have the same shared key, both the access point and the setting and linking application perform an operation process to operate the floating service set identifier with the shared key to form a dynamic key and convert the dynamic key into a wireless network encryption algorithm; thereby, the host system links to the access point to perform a wireless communication via the wireless network encryption algorithm.

8. The automatic wireless network linking device with a security configuration as claimed in claim 7, wherein the floating service set identifier further comprises a device name for inputting the name of the access point to form a passive variable; thereby, the floating service set identifier includes the prefix name, the random number identifier, and the device name, and the generated floating service set identifiers are different from each other due to the active variable and the passive variable.

9. The automatic wireless network linking device with a security configuration as claimed in claim 7, wherein a physical address, a user name, and a password are added into the operation process to be assembled with the floating service set identifier and operate with the shared key to form the dynamic key.

* * * * *